Figure 15:
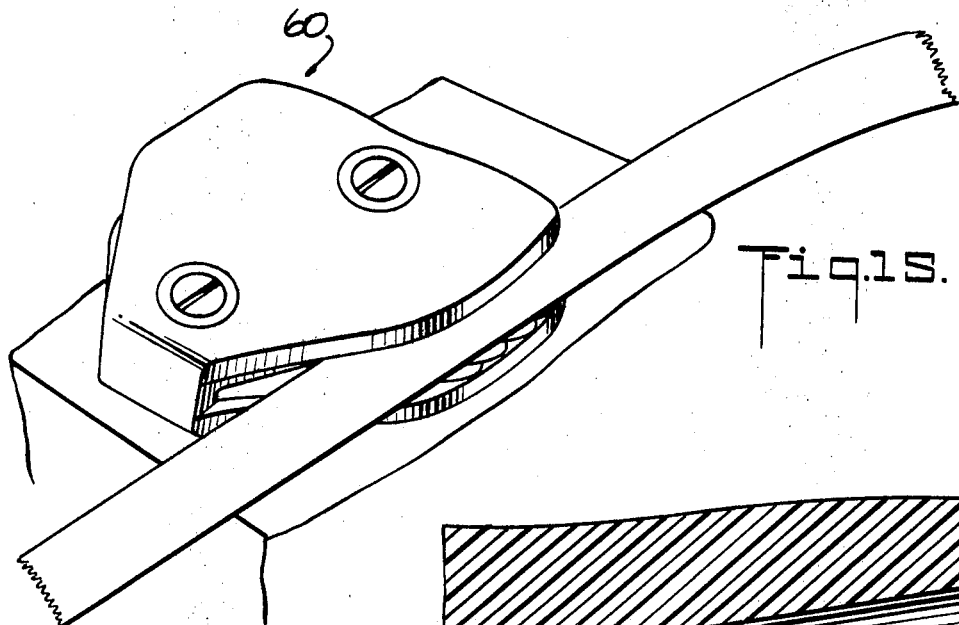

United States Patent

[11] 3,574,900

| [72] | Inventor | Reginald John Emery<br>88 Sweet Briar, Welwyn Garden City,<br>England |
|---|---|---|
| [21] | Appl. No. | 707,608 |
| [22] | Filed | Feb. 23, 1968 |
| [45] | Patented | Apr. 13, 1971 |
| [32] | Priority | May 11, 1964 |
| [33] | | Great Britain |
| [31] | | 19462/64 |
| | | Continuation-in-part of application Ser. No. 433,317, Feb. 17, 1965, now abandoned. |

[54] JAMMING CLEAT
10 Claims, 15 Drawing Figs.

[52] U.S. Cl. .................................................. 24/130,
24/81, 114/218
[51] Int. Cl. ..................................................... F16g 11/04,
A44b 21/00
[50] Field of Search ........................................... 24/130;
339/273, 273 (F), 81 (F)

[56] References Cited
UNITED STATES PATENTS

| 590,832 | 9/1897 | Grimm | 174/175 |
| 774,900 | 11/1904 | Wilson | 24/130UX |
| 1,761,630 | 6/1930 | Jentzen | 24/138 |
| 2,885,066 | 5/1959 | Presti | 24/130X |

FOREIGN PATENTS

| 520 | 1/1886 | Great Britain | 24/130 |
| 11,658 | 9/1886 | Great Britain | 24/130 |

Primary Examiner—Bernard A. Gelak
Attorney—March, Gillette & Wyatt

ABSTRACT: A cleat for securing a line, cable or similar elongated members that has a base with a head and tail end portions. A pair of spaced walls are provided which project from the base, and opposing interior surfaces of the walls are inclined away from each other to form a slot to receive and secure an elongated member. The interior surfaces are inclined relative to each other at an angle of between eight and 20°. In addition, the interior surfaces have a plurality of parallel ridges and grooves sloping towards the head in portion of the base at an angle of between 20° and 50° to the plane of the base.

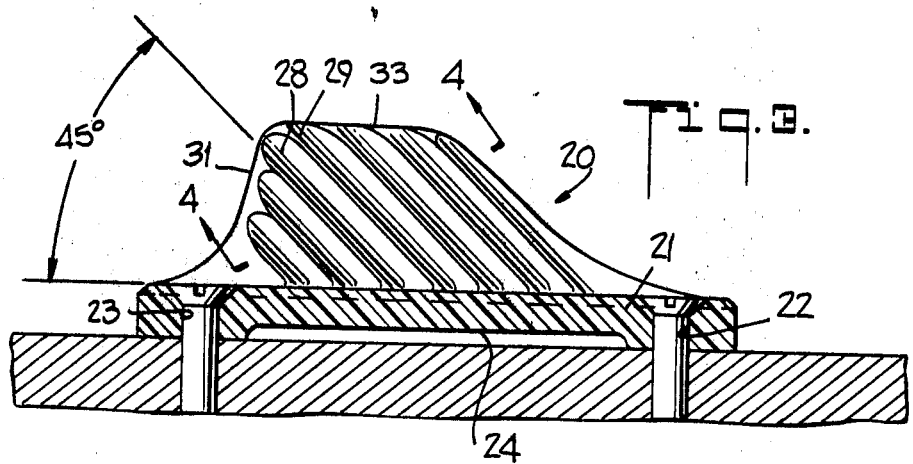
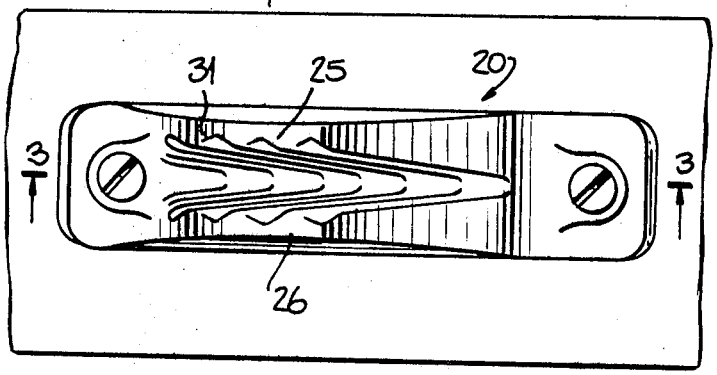
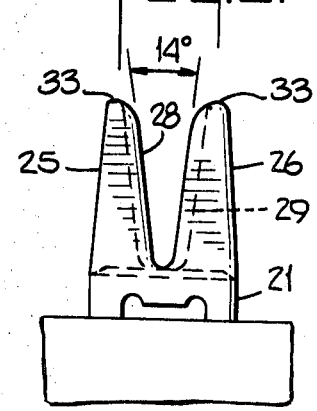
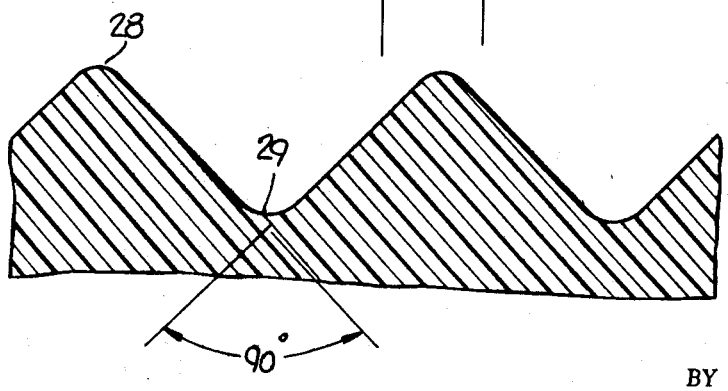

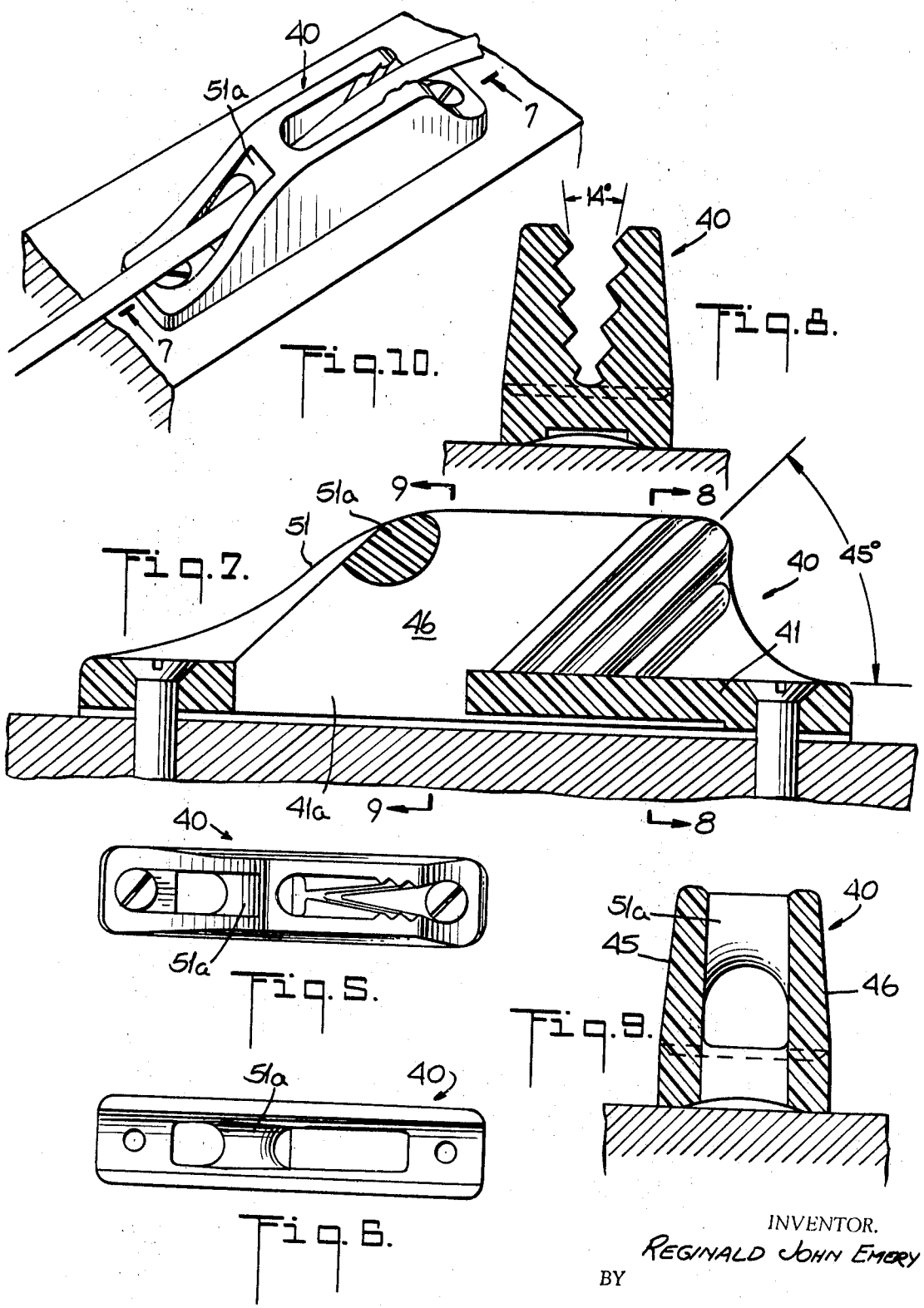

Patented April 13, 1971

3,574,900

3 Sheets-Sheet 3

INVENTOR.
REGINALD JOHN EMERY
BY
Marsh, Gillette & Wyatt
ATTORNEYS

JAMMING CLEAT

This is a continuation-in-part of applicant's previously filed application Ser. No. 433,317 having a filing date of Feb. 17, 1965, now abandoned.

The present invention relates to a novel jamming cleat for securely holding lines, ropes, cords, and similar items.

Previous devices for holding lines, ropes and the like have been relatively cumbersome to use and/or have been relatively expensive to manufacture.

It is an object of this invention to provide a novel jamming cleat that secures a rope or line by causing the rope or line to be progressively wedged in the cleat where the pull on the rope or line is increased.

It is another object of this invention to provide such a cleat wherein a rope or line may be readily engaged and disengaged with a minimum of effort on the part of the user.

It is another object of this invention to provide such a cleat that is integrally formed and does not have any moving parts.

It is another object of this invention to provide such a cleat that is relatively economical to manufacture.

It has now been found that the foregoing objects and other advantages can be readily attained in a cleat for securing a line, cable or similar elongated members that has a base with a head and tail end portions and a pair of spaced walls projecting from the base. The opposing interior surfaces of the walls are inclined away from each other to form a slot to receive and secure an elongated member. The interior surfaces are inclined relative to each other at an angle of between 8° and 20°. In addition, the interior surfaces have a plurality of generally parallel ridges and grooves sloping toward the head end portion of the base at an angle of between 20° and 50° to the plane of the base.

The ridges have an apex angle of between 40° and 100° and the free ends of the walls and the adjacent portion of the ridges are chamfered to provide a lead-in surface to the slot. A bridge may be provided between portions of the free ends of the sidewalls extending towards the tail end portion of the base.

The interior surfaces are inclined to form a V-shaped slot that is open toward the head and tail end portion of the base to receive the elongated member. The sidewalls have lip portions at the free ends thereof facing generally away from the base and head and tail end portions generally towards the head and tail end portions of the base. Some of the ridges and grooves extend to the lip portions and others extend to the head portions of the sidewalls. A bridge may be provided between the tail portions of the sidewalls adjacent the lip portions.

It has been found that certain angles of the cleat are of critical nature. It is necessary for the interior surfaces to be inclined relative to each other at an angle of between 8° and 20° with the angle of 14° having been found to be most desirable. The parallel ridges and grooves should slope towards the head and tail portion of the base at an angle of between 20° and 50° to the plane of the base with the angle of 45° having been found to be desirable. The ridges have an apex angle of between 40° and 100° with the angle of 90° having been found to be desirable. The cleats of this invention may be made of relatively rigid material and may be made by a molding or casting process, for example, by injection molding of a synthetic resin material such as that sold under the trademark Nylon.

The cleat of this invention is particularly adapted to securely hold an elongated member such as a line, rope or cable which is deformable so that it may be progressively wedged down into the cleat as the pull on the line, is increased.

In another embodiment of this invention the cleat may have a face with a head and tail end portions and a pair of spaced walls projecting from each of two opposing sides of the base extending between the head and tail end portions. The opposing extending walls of the pairs of spaced walls are generally positioned in parallel planes. This double cleat is particularly adapted for being placed in a horizontal position, such as on the deck of a sailboat.

Figure 14:
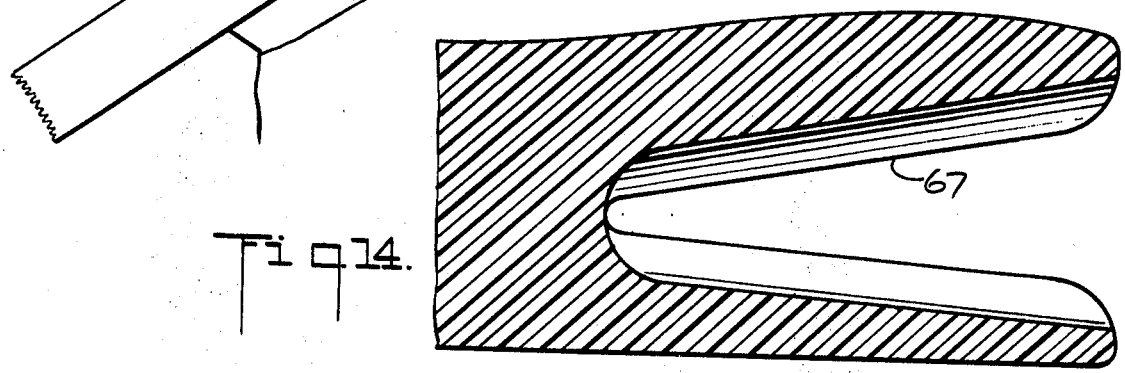
Figure 12:
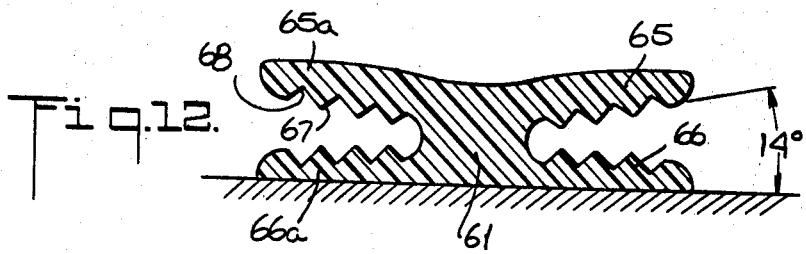
Figure 13:
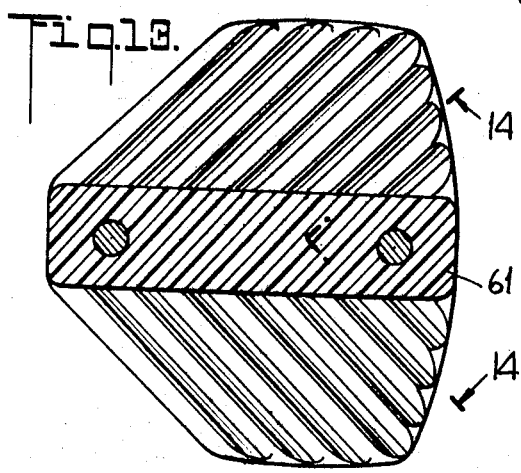
Figure 11:
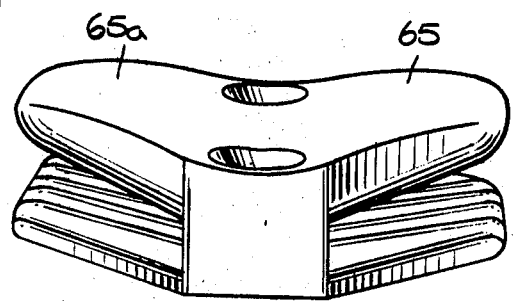

Other objects and advantages will be readily apparent from the following detailed specification, the claims and the drawings appended hereto wherein:

FIG. 1 is a top view of the cleat of this invention.
FIG. 2 is a end view of the cleat of FIG. 1.
FIG. 3 is a cross-sectional view of the cleat of FIG. 1.
FIG. 4 is an enlarged fragmentary cross-sectional view through a portion of the ridges of the cleat of FIG. 1.
FIG. 5 is a top view of another embodiment of this invention in the form of a cleat with a bridge or fair-lead.
FIG. 6 is a view of the under side of the cleat of FIG. 5.
FIG. 7 is an enlarged cross-sectional view of the cleat of FIG. 5.
FIG. 8 is a cross-sectional view along lines 8–8 of the FIG. 7.
FIG. 9 is a cross-sectional view along lines 9–9 of FIG. 7.
FIG. 10 is an enlarged perspective view of the cleat of FIG. 5 illustrating a rope engaged therein.
FIG. 11 is a perspective view of another embodiment of this invention in the form of a double cleat.
FIG. 12 is a cross-sectional view of the cleat of FIG. 11.
FIG. 13 is another cross-sectional view of the cleat of FIG. 11.
FIG. 14 is an enlarged cross-sectional view of a portion of the cleat of FIG. 11.
FIG. 15 is a perspective view of the cleat of FIG. 11 with a single line engaged with the cleat.

Referring now to the drawings, there is illustrated in FIGS. 1 through 4 one form of the cleat of this invention, designated generally by the reference numeral 20. The cleat 20 has a base 21 which is generally in the form of a right rectangular prism. The left and right ends of the base 21, as viewed in FIG. 3, are called head and tail ends, respectively. Each end may be formed with an aperture 22 and 23 in order to enable the cleat to be attached to another member, such as the hull of a yacht, with suitable fastening means. The underside of the base 21 may be recessed at 24 to receive embossed lettering, if desired.

Upstanding from the base are a pair of spaced cooperating walls 25 and 26 formed with ridges 28 alternating with grooves 29. The internal face of one wall is inclined to that of the other by an angle of about 14°, as illustrated in FIG. 2. The V-shaped slot 30 formed between the two walls 25 and 26 is of a constant cross section over the major part of its length.

The ridges 28 and the grooves 29 formed on the inside of the walls are shown in detail in FIG. 4. The apex angle of each ridge is 90° and the tops and the bottoms of the ridges 28 and grooves 29, respectively, are rounded off, as shown. The ridges are parallel and slope at an angle of 45° to the head end of the base as illustrated in FIG. 3. Some of the ridges 28 extend to the head end 31 of the walls 25 and 26 and other ridges 28 extend to the open lips 33 forming the mouth of the cleat, that is, those portions of the walls 25 and 26 lying between the head and tail ends.

The walls and apices of the ends of the ridges are chamfered as at 34 and 35, as illustrated in FIG. 2, by advantageously being rounded on a radius. In one example, where the distance between adjacent apices, measured in a direction perpendicular to the length of the ridges is about 0.24", the radius of chamfering is about three-sixteenths inches. In the same embodiment the pitch of the ridges is 0.24" and the depth of the groove is 0.1". The ridges on opposite walls may be opposite one another, as illustrated, or they may be in a staggered relationship, if desired.

The cleat 20 is intended for use with lines, ropes, cords or cables which are deformable. The overall diameter of the rope may range from a little larger than, down to a little smaller than, the width of the slot at its mouth. To engage a rope in the cleat 20, it may be laid along the mouth of the cleat and pulled in a direction from left to right, as viewed in FIG. 3, that is, pulling from the head towards the tail of the cleat. As the rope is pulled, it is instantly gripped by the ridges 28 due to the slope thereof which causes the rope to be pulled downwardly in the direction of the ridges 28 between the walls 25 and 26 of the cleat. In this way the rope becomes progressively deformed and is pinched between the ridges as it is pulled towards the tail end so that it is held securely therein. The stronger the pull, the more the rope is forced into the V-shaped slot and hence the firmer is the grip of the cleat on the rope. The rope is very easily removed from engagement in the cleat by pulling in a direction from left to right, as viewed in FIG. 3, so that the rope is caused to ride up the ridges and pass freely from the mouth of the cleat.

Another embodiment of this invention is illustrated in FIGS. 5 through 10 and is similar to the embodiment illustrated in FIGS. 1 through 4 with the exception that the walls of the cleat are spanned by a fair-lead or bridge and the base is formed with an aperture. The cleat 40 of FIGS. 5—10 has a base 41 and sidewalls 45 and 46 forming an angle of 14°. Ridges 48 and grooves 49 are formed on the internal face of the walls and the ridges 49 slope at an angle of 45° to the head of the base 41. The head end, as viewed in FIG. 7, is on the right-hand side and the tail end is on the left-hand side. Near the tail end 51 the walls are spanned by a smoothly contoured bridge 51a and beneath the bridge the base is formed with a generally rectangular hole 41a.

In use, the rope to be engaged is placed under the bridge 51a in the position shown in FIG. 10. Engagement and disengagement are carried out in generally the same way as for the previously described embodiment.

The cleat 40 has the advantage over the cleat 20 of being stronger by virtue of the bridge 51a preventing the wedging action of the rope in position with respect to the cleat.

An additional embodiment of this invention is illustrated in FIGS. 11 through 15 in the form of an integrally formed double cleat. The double cleat is particularly adapted for use with the walls of the cleat lying in a generally horizontal plane, for instance, such use as having the double cleat attached to the deck of a sailboat. The cleat 60 comprises a base 61 from one side of which extends a pair of walls 65 and 66 inclined relative to each other at an angle of 14°. The walls are formed with internal ridges 67 and grooves 68 similar to those of the cleats 20 and 40. From the other side of the base 61 there extends outwardly therefrom another pair of walls 65a and 66a also inclined at an angle of 14° and internally ridged and grooved in the same manner as the walls 65 and 66. The double cleat also has a 45° slope for the ridges and the mouth of each cleat is chamfered to facilitate entry of a rope therein. The walls 66 and 66a have their exterior surface lying in a common plane and the base 61 is formed with holes for fasteners for attaching the cleat to the flat portion of a floor or deck.

In this invention it has been found that certain angles are critical. For the angle between the walls, the angle of 14° is the optimum and the angles between 8° and 20° provide satisfactory operation. The slope of the ridges with respect to the longitudinal direction to provide satisfactory operation should be between 20° and 50°, 45° having been found to be generally desirable. The apex angle of the ridges may vary from 40° to 100°, 90° having been found to be generally desirable. In addition, it has been found that the lead-in radius of the teeth is important to effectively cause the line to move into engagement with the ridges.

It is understood that the foregoing description with the details of exemplary structure is not to be construed in any way to limit the invention, but that modifications may be made thereto without departing from the scope of the invention as set forth in the following claims.

I claim:

1. A cleat for securing a line, cable or similar elongated members comprising a base having a head and tail portions, said base only having means for anchoring to a member, a pair of space walls projecting substantially normally from said base and integral therewith, the opposing interior surfaces of said walls being inclined away from each other substantially uniformly from said base to the outer edges of said walls to form a slot to receive and secure an elongated member, said interior surfaces being inclined relative to each other at an angle between about 8° and about 20°, said interior surfaces having a plurality of generally parallel ridges and grooves sloping toward said head end portion of said base at an angle of between 20° and 50° to the plane of said base, said ridges and grooves forming V-shapes which extend substantially to the bottom of said interior surfaces adjacent said base.

2. The cleat of claim 1 wherein said ridges have an apex angle of between 40° and 100°.

3. The cleat of claim 1 wherein a bridge is provided between portions of the free ends of said walls extending toward said tail end portion of said base.

4. The cleat of claim 1 wherein said interior surfaces are inclined at an angle of about 14° relative to each other and wherein said slot is V-shaped and is open toward said head and tail end portions of said base to receive an elongated member.

5. The cleat of claim 4 wherein said ridges and grooves slope toward said head end portion of said base at an angle of about 45° to the plane of said base and the free ends of said walls and the adjacent portions of said ridges are chamfered to provide a lead-in surface to said slot.

6. The cleat of claim 1 wherein said sidewalls have lip portions at the free ends thereof facing generally away from said base and head and tail portions facing generally toward said head and tail portions of said base, and wherein some of said ridges and grooves extend to said lip portions and others of said ridges and grooves extend to said head portions of said sidewalls.

7. The cleat of claim 6 wherein said interior surfaces are inclined at an angle of about 14° relative to each other and said ridges and grooves slope toward said head end portion of said base at an angle of about 45° to the plane of said base.

8. The cleat of claim 7 wherein a bridge is provided between said tail portions of said sidewalls adjacent said lip portions.

9. The cleat of claim 1 wherein two pairs of spaced walls project from said base integrally therewith, the opposing interior surfaces of each of said pair of walls being inclined relative to each other at an angle between about 8° and 20°, said interior surfaces having a plurality of generally parallel ridges and grooves sloping toward said head end portion of said base at an angle of between 20° and 50° to the plane of said base, said ridges and grooves forming V-shapes which extend substantially to the bottom of said interior surfaces adjacent said base.

10. The cleat of claim 9 wherein said ridges have an apex angle of between 40° and 100°.